United States Patent
Karpushko

(10) Patent No.: US 8,315,284 B2
(45) Date of Patent: Nov. 20, 2012

(54) INTRACAVITY FREQUENCY CONVERSION OF LASER RADIATION

(76) Inventor: Fedor V. Karpushko, Dortmund (DE)

( * ) Notice: Subject to any disclaimer, the term of this patent is extended or adjusted under 35 U.S.C. 154(b) by 304 days.

(21) Appl. No.: 12/796,998

(22) Filed: Jun. 9, 2010

(65) Prior Publication Data

US 2010/0238960 A1 Sep. 23, 2010

Related U.S. Application Data

(62) Division of application No. 10/489,304, filed as application No. PCT/GB02/04307 on Sep. 20, 2002, now Pat. No. 7,760,774.

(30) Foreign Application Priority Data

Sep. 20, 2001 (GB) .................................. 0122670.3

(51) Int. Cl.
*H01S 3/10* (2006.01)
*H01S 3/93* (2006.01)
(52) U.S. Cl. ................. 372/22; 372/72; 372/93; 372/97
(58) Field of Classification Search ............... 372/22, 372/72, 93, 97
See application file for complete search history.

(56) References Cited

U.S. PATENT DOCUMENTS

| | | |
|---|---|---|
| 4,739,508 A | 4/1988 | Clark |
| 5,671,240 A | 9/1997 | Okazaki |
| 6,031,854 A | 2/2000 | Ming |
| 6,061,370 A | 5/2000 | Yin |
| 6,167,068 A | 12/2000 | Caprara et al. |
| 6,327,281 B1 | 12/2001 | Yin |
| 2004/0252734 A1 | 12/2004 | Karpushko |
| 2007/0274364 A1 | 11/2007 | Brown et al. |

FOREIGN PATENT DOCUMENTS

| | | |
|---|---|---|
| EP | 1744414 A2 | 1/2007 |
| JP | 01-274487 | 11/1989 |
| JP | 02-126242 | 5/1990 |
| JP | 02-156690 | 6/1990 |
| JP | 02-195332 | 8/1990 |
| JP | 02-301178 | 12/1990 |

(Continued)

OTHER PUBLICATIONS

C.C. Davis "Laser and Electro-Optics Fundamentals and Engineering", Cambridge University Press, p. 180.

(Continued)

*Primary Examiner* — Patrick Stafford
*Assistant Examiner* — Marcia Golub-Miller
(74) *Attorney, Agent, or Firm* — Senniger Powers LLP

(57) ABSTRACT

A laser device with frequency conversion, the device comprising a complex optical cavity comprising two cavity parts with two different levels of circulating intracavity power wherein there is placed at least one non-linear crystal (30) is placed within the cavity part of higher circulating power and an active medium (21) in the cavity part of lower circulating power, the power enhancement achieved in two steps and the total enhancement being the product of the enhancement factors in each step, providing additional freedom in design allowing both the condition for high enhancement of the interacting laser power inside the intracavity non-linear crystal and the condition for maximum power output from the laser to be satisfied simultaneously and wherein said complex optical cavity the first cavity part provides the initial step of power enhancement and comprises at least a laser cavity back mirror (20), highly reflective about a laser radiation fundamental frequency .omega., and an active (gain) medium.

20 Claims, 2 Drawing Sheets

FOREIGN PATENT DOCUMENTS

| | | |
|---|---|---|
| JP | 03-145777 | 6/1991 |
| JP | 03-248588 | 11/1991 |
| JP | 05-243661 | 9/1993 |
| JP | 06-143437 | 5/1994 |
| JP | 09-167868 | 6/1997 |
| JP | 11-068210 | 3/1999 |

OTHER PUBLICATIONS

Karpushko, Fedor, Continuous Wave Single Longitudinal Mode SHG with Two Stages of Intra-Cavity Power Enhancement at Fundamental Frequency, Klastech—Karpushko Laser Technologies GmbH, Feb. 7, 2008, 7 pages, International Society for Optical Engineering, Germany.

Japanese Patent Application No. 2003-529585 Office Action (English Translation), Japan Patent Office, Sep. 26, 2006, 3 pages, Japan.

PCT International Search Report for PCT/EP2009/003367, European Patent Office, Jul. 24, 2009, 5 pages, Munich, Germany.

T. Numai "Fundamentals of Semiconductor Lasers" Springer, pp. 28-29.

L. F. Vitushkin et al, Nonlinear Effects in the Active Medium of Lasers and the Measurements of Small Displacements, Optics and Spectroscopy, American Institute of Physics, Washington, US, vol. 59, No. 5, Nov. 1, 1985, pp. 659-662.

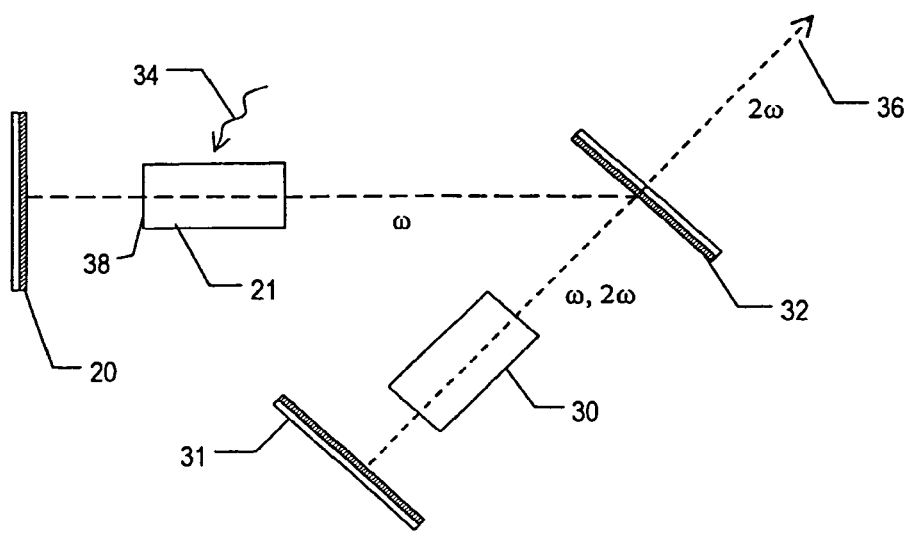
FIG. 1 – PRIOR ART
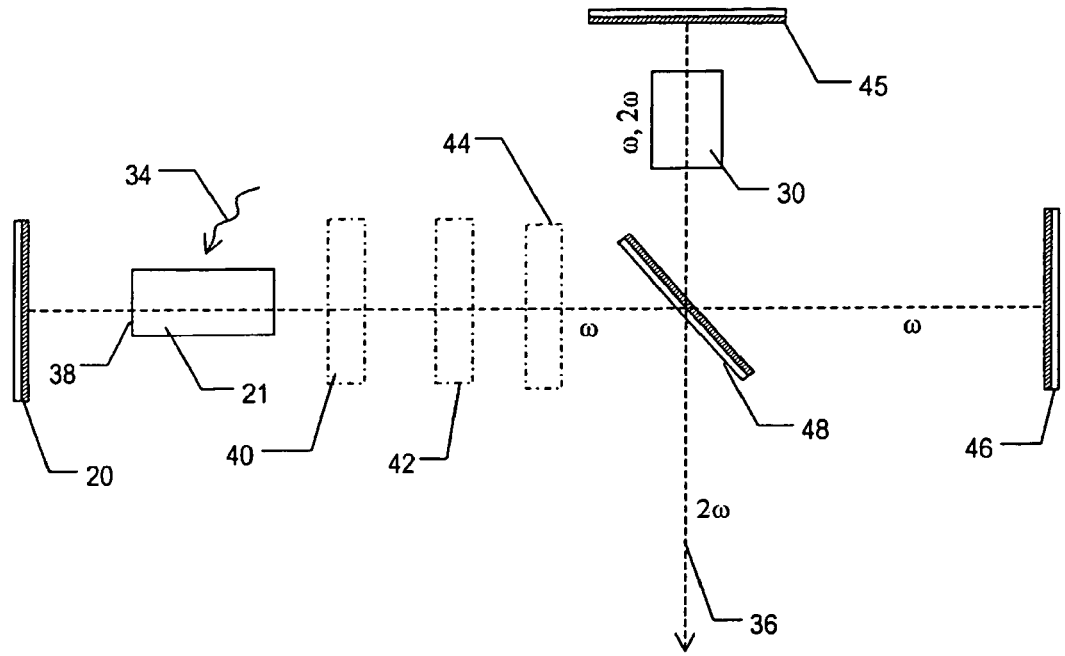
FIG. 2

INTRACAVITY FREQUENCY CONVERSION OF LASER RADIATION

CROSS-REFERENCE TO RELATED APPLICATION

This application is a divisional of pending U.S. patent application Ser. No. 10/489,304, filed Mar. 16, 2004, the entirety of which is hereby incorporated by reference.

The present invention relates to frequency conversion of laser radiation by means of non-linear interaction of laser radiation with a suitable non-linear optical material. In particular the invention relates to intracavity Second Harmonic Generation (SHG), also called Frequency Doubling (FD), and intracavity Optical Parametric Oscillation (OPO). The invention can be also applied to intracavity Third and Fourth Harmonic Generation as well as for intracavity Raman Frequency Shifting (RFS).

In a non-linear frequency conversion process the efficiency for conversion of laser power at a fundamental frequency into power at combined frequencies (for example, the second harmonic frequency) is strongly dependent on the intensity of radiation interacting with the non-linear optical material (non-linear crystals). In practice, interacting intensities within a range of $10^6$-$10^8$ W/cm$^2$ are needed for achieving practically significant conversion efficiencies, even for the best non-linear crystals known. To increase the interacting intensity it is common to focus the radiation incident upon the non-linear crystal.

In the case of continuous wave (CW) lasers of low and moderate powers an increase of the intensity by focusing is still not enough for obtaining reasonable conversion efficiencies, and a further enhancement of laser light intensity inside the non-linear crystal remains necessary. This can be achieved by placing the non-linear crystal within the laser cavity, where radiation power is increased compared with the power available from outside the cavity of the same laser, providing power enhancement inside the crystal by tens or even hundreds of times. Such schemes are discussed in, for example, W. Koechner, "Solid-State Laser Engineering", Third Edition, Springer-Verlag, 1992.

However, such an intracavity arrangement (for example, for SHG or OPO), which provides a satisfactory condition for interaction within the non-linear crystal, generally does not allow for high efficiency of a laser system as whole. This is because the condition for large enhancement of the fundamental frequency power inside the laser cavity is at variance with the condition for maximum extraction of the power available from the laser at a particular level of pump power supplied to the laser.

For maximum out-coupling of the generated power from the laser the useful cavity loss needs to be of a certain (optimal) value that increases with increase of pump power. The cavity loss comprises two parts, the first part being the useful loss due to the laser output and the second part being an internal (also called useless) cavity loss as the result of inevitable power dissipation from the laser cavity due to scattering, re-absorption, residual reflection and/or transmission by cavity components, and other factors. For effective interaction inside the non-linear crystal the power enhancement factor always needs to be high. This can be achieved by decreasing the cavity loss to a value as small as reasonably possible, which, however, results in the condition for out-coupling the laser power straying from its optimum value.

As a result of the relationship between the intracavity power enhancement and optimal power extraction from the laser cavity, the overall efficiency of intracavity SHG (or other intracavity frequency conversion processes such as OPO) with respect to pump power applied to the laser is low, usually far below 10%.

Another disadvantage of the above intracavity arrangement for frequency conversion of laser radiation is high sensitivity of the laser output to small environmental changes, thermal effects, scattering by air, and the like. As the cavity loss is kept at a small value, small external disturbances can noticeably change the balance between the useful and internal loss of the laser cavity, leading to a strong variation of the laser output. This decreases the laser stability and necessitates stabilization measures and tight tolerances in the laser components used.

It is an aim of the present invention to eliminate or reduce one or more of the above disadvantages of the intracavity frequency conversion of laser radiation, in particular (but not exclusively) for intracavity SHG and intracavity OPO, providing improvement of overall laser system efficiency and stability.

The inventor has established a new concept for intracavity frequency conversion, the concept termed Double Enhanced IntraCAvity Frequency Conversion (DENICAFC) and, in particular but not exclusively, Double ENhanced IntraCAvity Frequency Doubling (DENICAFD) that is based on using a complex cavity capable of enhancing power interacting with the non-linear crystal in two steps (double enhancement) with respect to the power available from outside the laser cavity.

According to a first aspect of the invention there is provided a laser device with frequency conversion, the device comprising a complex optical cavity comprising two cavity parts with first and second different levels of circulating intracavity power wherein at least one non-linear crystal is placed within the cavity part of higher circulating power and an active medium in the cavity part of lower circulating power.

The advantage of achieving power enhancement in two steps, with the total enhancement factor being the product of the enhancement factors in each step, is that it provides additional freedom in design allowing both the condition for high enhancement of the interacting laser power inside the intracavity non-linear crystal and the condition for maximum power output from the laser to be satisfied simultaneously. These two steps of enhancement will now be explained in more detail.

In said complex optical cavity the first cavity part provides the initial step of power enhancement and comprises at least a laser cavity back mirror, highly reflective about a laser radiation fundamental frequency .omega., and an active (gain) medium.

The first cavity part may also include polarization and/or wavelength selectors. The first cavity part may also include cavity loss modulators, for example as used for Q-switching. There will generally be provided suitable pumping means for the active (gain) medium.

It will be understood that the term "active (gain) medium" refers to any suitable laser material, in particular but not necessarily a solid state (for example crystalline, glassy, semiconductor, semiconductor compound such as Vertical Cavity Surface Emitting Laser—VCSEL—structure-s, etc.) laser material that, being pumped or excited appropriately, is capable of amplifying and emitting radiation within a certain spectral range.

The second cavity part of the complex cavity comprises a resonant reflector incorporating at least one non-linear crystal. As a result of having an optical non-linearity built-in this cavity part functions as a non-linear resonant reflector at the laser fundamental frequency, .omega.. The backward reflectivity of the non-linear resonant reflector, with respect to radiation incident upon it from the first cavity part, is self-regulated by the presence of a non-linear crystal to be as close to the optimal value for out-coupling the fundamental frequency power circulating within the first cavity part.

Placing a non-linear optical medium for frequency conversion within a resonant reflector layout makes use of the power enhancing property of the resonant cavity part. This also gives rise to and use of an additional feature of the resonant reflector, namely, self regulation of its backward reflectivity at the fundamental frequency .omega. close to the optimal value with regard to power out-coupling from the first part of the laser cavity.

Thus the second part of the laser cavity as described above, being the non-linear resonant reflector, provides the second step of power enhancement for intracavity frequency conversion, and at the same time performs as an optimal output coupler, therefore allowing for maximum extraction of power. The self regulation property results in improved stability and more relaxed tolerances in manufacture and/or alignment of cavity components.

In one preferred embodiment, suitable for intracavity frequency conversion, said second cavity part of said complex optical cavity is formed by two end mirrors, highly reflective about the fundamental laser radiation frequency .omega., and a beamsplitter mirror, partially transmitting/reflecting about the fundamental laser radiation frequency .omega., wherein all three mirrors are arranged in a configuration to provide resonant reflection backward to the first cavity part, and incorporates a non-linear element within the optical path between the beamsplitter and one of said end mirrors.

The frequency conversion may include processes such as second, third and fourth harmonic generation, optical parametric oscillation and intracavity Raman frequency shifting.

In addition to the above reflectivity conditions about the laser radiation fundamental frequency .omega. for the mirrors of the second cavity part comprising the non-linear resonant reflector part of the complex optical cavity, the reflectivity of these mirrors about a combined frequency (for example the second harmonic, or OPO generated, or Raman shifted frequency) can be chosen so as to output the laser radiation power at said combined frequency in desired direction(s).

For the case of uni-directional output, one of the end mirrors of the non-linear resonant reflector part is made highly reflective at the combined frequency, while at least one of the beamsplitter and the second end mirror at the combined frequency is made relatively transmissive, dependent on the desired direction of the output power.

In another preferred embodiment, suitable for intracavity frequency tripling and quadrupling, said second cavity part of the laser cavity as described above incorporates two non-linear crystals, one phase-matched for SHG (.omega.+.omega.) and another phase-matched matched for tripling (.omega.+2.omega.) or quadrupling (2.omega.+2.omega.), wherein in addition to the reflectivity conditions about the laser radiation fundamental frequency .omega. all three mirrors of the second cavity part of the laser cavity also can be highly reflective about the frequency 2.omega. to enhance the second harmonic power within the non-linear crystals as well. The choice for reflectivity of these mirrors at the third or fourth harmonic remains dependent on the desired direction of the output.

The back mirror of said first cavity part may be fabricated on the appropriate end of the active (gain) medium.

The complex cavity is preferably configured so as to maximize laser output, and hence to maximize the laser efficiency with respect to the pump power supplied to the gain medium. The complex cavity is preferably configured so as to provide minimal sensitivity of output power to cavity loss variations caused by external disturbances.

The mirror curvatures of first and second parts of the complex laser cavity can be chosen and the mirrors configured so as to match the transverse and longitudinal mode structure of the laser beam within the complex cavity.

There is further provided a method of laser radiation frequency conversion in accordance with the apparatus as described above.

BRIEF DESCRIPTION OF THE DRAWINGS

Embodiments of the invention will now be described, by way of example only, with reference to the accompanying drawings, in which:

FIG. 1 shows a known laser cavity layout commonly used for intracavity SHG;

FIG. 2 shows a laser cavity configuration suitable for double enhanced intracavity frequency doubling according to one embodiment of the invention;

DETAILED DESCRIPTION OF THE EMBODIMENTS

Figure 3:
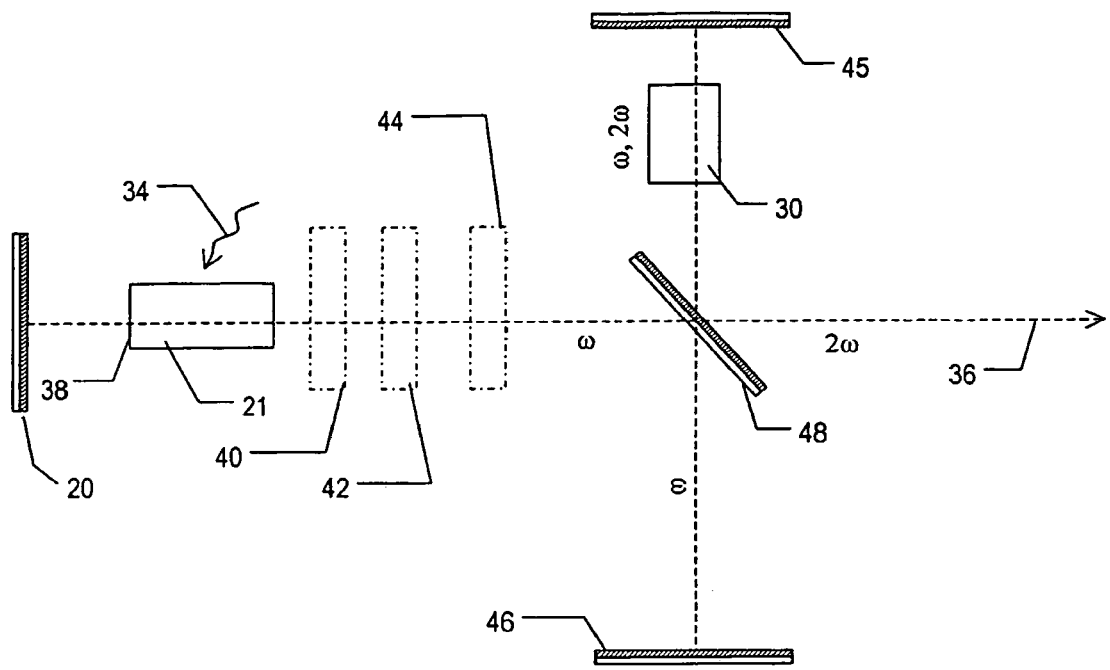
FIG. 3 shows an alternative cavity configuration suitable for double enhanced intracavity frequency doubling.

FIG. 1 shows a layout of laser cavity principal optical components previously proposed for intracavity frequency doubling, where the cavity back mirror 20, active (gain) medium 21, non-linear crystal 30, and mirror 31 comprise a linear type (as opposed to a ring geometry) laser cavity, folded by cavity folding mirror 32 for allowing uni-directional extraction of generated power at frequency 2.omega. (second harmonic). The waved arrow 34 indicates that an appropriate pump of the active medium 21 is arranged. In such a layout all three mirrors 20, 32, and 31 are made highly reflective at the laser fundamental frequency. Commonly, the reflectivity of these mirrors are made as close to 100% as technologically possible by mirror manufacturers. For uni-directional extraction of second harmonic power the mirror 31 is also made highly reflective at frequency 2.omega., while the folding mirror 32 is made as transparent as possible at frequency 2.omega. Thus the cavity resonates and enhances the circulating laser power at the fundamental frequency .omega. Power at a combined frequency of 2.omega., being the combined frequency generated by non-linear interaction within the crystal 30, is ejected as indicated by path 36 via the folding mirror 32, after each "forward-backward" (round-trip) passing through non-linear crystal 30.

In this scheme the only useful loss of the generated fundamental frequency power is by non-linear conversion into the second harmonic power by the non-linear crystal 30, and is usually less than 1% per cavity round-trip in the case of continuous wave (CW) lasers of small or moderate powers (in the range of milliwatts to a few watts). Despite careful measures to minimize the internal cavity loss by using anti-reflection (AR) coatings at the non-linear crystal and active medium end surfaces and forming the cavity mirror 20 onto the rear surface 38 of the laser gain medium 21, the remaining reflections of AR-coated surfaces and residual transmission of the cavity mirrors at the fundamental frequency .omega., along with cavity diffraction loss, scattering and re-absorption inside the active medium and non-linear crystal, introduce a significant useless loss of the generated fundamental power that can be comparable and even in excess of 1% per cavity round trip. As a result, the total cavity loss is dominated by the internal (useless) part therefore making overall laser efficiency rather small with respect to the pump power and very sensitive to any outside disturbances.

FIG. 2 shows an embodiment of an apparatus for implementing a method of what we shall term double enhanced intracavity frequency doubling (DENICAFD). The first part of a complex cavity comprises as before the cavity back mirror 20, with high reflectivity at the laser fundamental frequency .omega., and active (gain) medium 21. It may also include other optical elements such as polarization and/or wavelength selectors 40, 42, and cavity loss modulator 44. The cavity back mirror 20 can also be deposited onto the rear surface 38 of the active medium 21. The waved arrow 34 in the drawing indicates that an appropriate pump of the active medium 21 is arranged.

The second part of the laser cavity makes up the non-linear resonant reflector and comprises two end mirrors 45 and 46, highly reflective at the laser fundamental frequency .omega., a beamsplitter mirror 48 being partially reflective at the frequency .omega., and a non-linear crystal 30 of an appropriate orientation to provide the phase matching condition for frequency doubling. To achieve the highest efficiency of the laser, the reflectivity of the mirrors 20, 45 and 46 should be made as close to 100% as technologically possible at the required fundamental laser frequency, .omega. The appropriate partial reflectivity value of the beamsplitter mirror 48 is any value lying within some range around the reflectivity that would be chosen for an optimal output coupler, if such a coupler were to be used (instead of the non-linear resonant reflector) simply to extract maximum power from the laser at the fundamental frequency. The skilled person is familiar with the criteria for establishing the optimal reflectivity for such an arrangement.

In the cavity layout of FIG. 2 the non-linear crystal 30 is shown, by way of example only, within the non-linear resonant reflector path between the mirrors 48 and 45, that is, angled to the optical axis of the first part of the cavity. The non-linear crystal can be also placed in the path between the mirrors 46 and 48. There is no specific restriction on choosing the angle (for example 90.degree.) of folding the non-linear resonant reflector part of the laser cavity with respect to the optical axis of the first cavity part, (and accordingly, the angle of tilting the beamsplitter mirror 48) except those dictated by convenience of design and alignment.

With the above reflectivities of the laser cavity mirrors the fundamental frequency power circulating inside the cavity of FIG. 2 has two different levels: a lower level within the cavity path between the cavity back mirror 20 and beamsplitter mirror 48, and a higher level within the non-linear resonant reflector path between the mirrors 46, 48 and 45. The lower level, however, is already an enhanced level of the fundamental frequency power as compared with what it would be outside the laser cavity. Thus, for the non-linear crystal being placed within the non-linear resonant reflector part of the laser cavity there are two stages of enhancement of the fundamental frequency power. Due to the optical non-linearity being incorporated within the resonant reflector, the backward reflectivity (in the direction of the cavity back mirror 20) is self regulated to be close to the optimal value for outcoupling the fundamental frequency power that is circulating within first part of the laser cavity. This provides the condition for the maximum second harmonic output with respect to the pump power supplied to the active (gain) medium and hence the optimum laser efficiency, and provides minimal sensitivity of the laser output to the laser cavity internal loss variations due to external disturbances and limited spec tolerances of the laser cavity components.

To arrange for the unidirectional output of the second harmonic power from the laser, the reflectivities of the mirrors 45, 48 and 46 at the frequency 2.omega. must be chosen appropriately. In the case as shown in FIG. 2, for example, the mirror 45 is also highly reflective at 2.omega. and the beamsplitter mirror 48 is highly transmittive at 2.omega. Hence, the second harmonic output power is directed as shown by path 36. Alternatively, for the second harmonic power to be output through the mirror 46, the latter should be highly transmittive at the frequency 2.omega., while both the mirror 45 and the beamsplitter mirror 48 should be highly reflective at 2.omega.

FIG. 3 shows an alternative laser cavity layout for the implementation of double enhanced intracavity frequency doubling. The requirement for the cavity mirror's reflectivities at the laser fundamental frequency are the same as in the case of the layout of FIG. 2, except for the reflectivity value of the beamsplitter mirror 48. The reflectivity of mirror 48, for optimal performance of the laser at the fundamental frequency .omega., must in this case be approximately equal to the transmission of the beamsplitter mirror 48 of the layout of FIG. 2. There are no specific restrictions either with regard to choosing the angle between optical axis of first and second parts of the cavity, or with regard to in which path of the second part of the cavity (resonant reflector) to place a non-linear crystal. Again, as in the case of the layout shown in FIG. 2, the reflectivities of the mirrors 45, 48 and 46 at the second harmonic frequency 2.omega. are chosen appropriately to provide uni-directional second harmonic output in the desired direction.

In both the above cases the curvatures of the mirrors comprising the complex laser cavity and distances between them are chosen such as to match the transverse and longitudinal mode structure of the laser beam within the cavity. The criteria for this selection are familiar to those skilled in the art.

Figure 4:
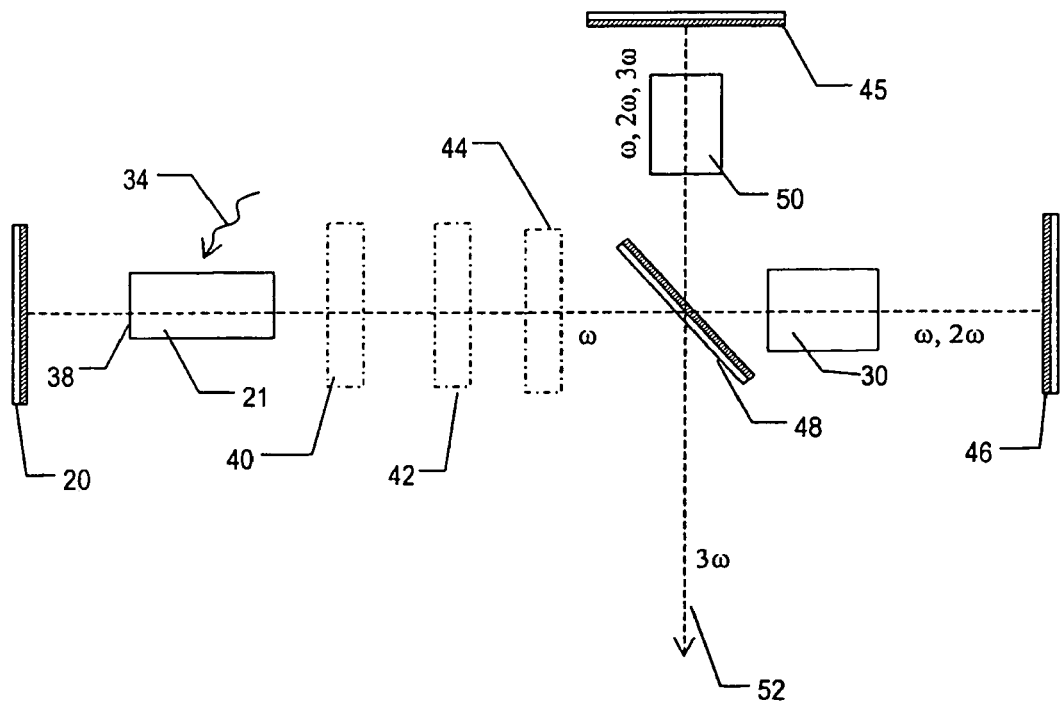
FIG. 4 shows a laser cavity configuration suitable for double enhanced intracavity frequency tripling or quadrupling.

FIG. 4 shows an extension of the cavity layout of FIG. 2 for use in double enhanced intracavity frequency tripling. In this case a second non-linear crystal 50, in an orientation to phase-match the sum frequency process (.omega.+2.omega.), is placed within the resonant reflector part of the laser cavity. The mirrors 45, 46, and made 48 are highly reflective about the second harmonic frequency 2.omega., while the condition for their reflectivity about the fundamental frequency .omega. remains the same as in the case of FIG. 2. Accordingly, for uni-directional output of the third harmonic power indicated by path 52, the mirror 45 is also highly reflective at the frequency 3.omega. while the beamsplitter mirror 48 is highly transmitting at the frequency 3.omega.

By choosing the phase matching conditions of the second non-linear crystal 50 in the layout of FIG. 4 for further doubling the second harmonic frequency 2.omega., with appropriate reflectivities of the resonant reflector mirrors at the fourth harmonic frequency 4.omega., a double enhanced intracavity frequency quadrupling can be achieved.

The skilled reader will appreciate that the invention is not limited to the specific implementations and applications detailed above. The configurations discussed above are also suitable for implementation of this invention in more general sense of what may be termed double enhanced intracavity frequency conversion (DENICAFC), for example intracavity optical parametric oscillation (OPO) or intracavity Raman frequency shifting (RFS). In such cases the phase matching conditions for a non-linear crystal as well as reflectivity of the resonant reflector mirrors have to be chosen accordingly about frequencies of the idler and signal waves (OPO) or about corresponding Stock's frequencies (RFS).

What is claimed is:

1. A laser device operating at a fundamental frequency ω and adapted for frequency conversion of said fundamental frequency to a second harmonic frequency, said device comprising:

a beamsplitter having partial reflectivity at the fundamental frequency ω to form a reflected fundamental beam, and said beamsplitter being highly reflective of the second harmonic frequency;

a complex optical cavity including said beamsplitter positioned within said complex optical cavity and dividing said complex optical cavity into:

a first cavity part comprising an active (gain) medium for providing power enhancement of the fundamental frequency, said first cavity part formed between a laser cavity back mirror and the beamsplitter; and a second cavity part forming a self-regulating resonant reflector for the fundamental frequency ω for optimally out-coupling the fundamental frequency power circulating in the first cavity part and for further providing power enhancement of the fundamental frequency beam circulating in the second cavity part, said resonant reflector defining a first optical path between the beamsplitter and a first end mirror for the fundamental beam transmitted by the beamsplitter and reflected by the first end mirror, said second cavity part further defining a second optical path between the beamsplitter and a second end mirror for the fundamental beam reflected by the beam splitter and the second end mirror, wherein said second optical path is different from the first optical path and wherein the first optical path and the second optical path do not overlap, said second cavity part comprising at least one nonlinear crystal placed in the first optical path for frequency conversion of the transmitted fundamental beam to the second harmonic beam and for self-regulation, wherein the beamsplitter is positioned such that the first cavity part is on one side of the beamsplitter and the second cavity part is on the other side of the beamsplitter, whereby the first cavity part provides a lower power level at the fundamental frequency ω and the second cavity part, being a resonant reflector at the fundamental frequency with respect to the first cavity part, provides a higher power level at the fundamental frequency ω to provide for an increase of the power of the second harmonic beam formed in the nonlinear crystal by the second harmonic generation process, the second harmonic beam being reflected by the beamsplitter as the laser output.

2. The laser device as claimed in claim 1 wherein the laser cavity back mirror, the first end mirror and the second end mirror are highly reflective at the fundamental frequency ω.

3. The laser device as claimed in claim 1 wherein the first cavity part further comprises at least one of the following: polarization selectors, wavelength selectors and cavity loss modulators for Q-switching.

4. The laser device as claimed in claim 1 wherein there is provided suitable pumping means for the active (gain) medium and wherein the active (gain) medium is any suitable laser material.

5. The laser device as claimed in claim 4 where the laser material is a solid state laser material that, being pumped or excited appropriately, is capable of amplifying and emitting radiation within a certain spectral range.

6. The laser device as claimed in claim 1 wherein backward reflectivity of the resonant reflector, with respect to radiation incident upon it from the first cavity part, is self-regulated by the presence of the nonlinear crystal in the second cavity part to be a substantially optimal value for out-coupling the fundamental frequency power circulating within the first cavity part.

7. The laser device as claimed in claim 1 wherein the second cavity part forming the resonant reflector provides the second step of power enhancement for intracavity frequency conversion, and at the same time performs as an optimal output coupler, maximizing extraction of power at the fundamental frequency from the first cavity part into the second cavity part.

8. The laser device as claimed in claim 1 wherein the beamsplitter and the first end mirror are highly reflective at the second harmonic frequency and the second end mirror is highly transmissive at the second harmonic frequency so as to output the second harmonic beam at the second harmonic frequency in a desired direction.

9. The laser device as claimed in claim 1 wherein the complex cavity is preferably configured so as to maximize laser output, and hence to maximize the laser efficiency with respect to the pump power supplied to the gain medium.

10. The laser device as claimed in claim 1 wherein mirror curvatures of the laser cavity back mirror, the first end mirror and the second end mirror are chosen and configured to match the transverse and longitudinal mode structure of the laser beam within the complex cavity.

11. A laser device operating at a fundamental frequency ω and adapted for frequency conversion of said fundamental frequency to a third or higher harmonic frequency, said device comprising:

a beamsplitter having partial reflectivity at the fundamental frequency ω to form a reflected fundamental beam, said beamsplitter having partial transmissivity at the fundamental frequency ω to form a transmitted fundamental beam, said beamsplitter being highly reflective of a second harmonic frequency 2ω, and said beamsplitter being highly transmissive of a third or higher harmonic frequency;

a complex optical cavity including said beamsplitter positioned within said complex optical cavity and dividing said complex optical cavity into:

a first cavity part comprising an active (gain) medium for providing power enhancement of the fundamental frequency, said first cavity part formed between a laser cavity back mirror and the beamsplitter; and a second cavity part forming a self-regulating resonant reflector for the fundamental frequency ω for optimally out-coupling the fundamental frequency power circulating in the first cavity part and for further providing power enhancement of the fundamental frequency beam circulating in the second cavity part, said resonant reflector defining a first optical path for the transmitted fundamental beam and a second harmonic beam between the beamsplitter and a first end mirror, said second cavity part further defining a second optical path for the reflected fundamental beam and the second harmonic beam between the beamsplitter and a second end mirror, wherein said second optical path is different from the first optical path and wherein the first optical path and the second optical path do not overlap, said second cavity part comprising a first nonlinear crystal in the first optical path for frequency conversion of the transmitted fundamental beam to the second harmonic beam, said second cavity part further comprising a second nonlinear crystal placed in the second optical path for frequency conversion of the reflected fundamental beam and the second harmonic beam to a higher harmonic beam at the third or higher harmonic frequency and for self-regulation, wherein the beamsplitter is positioned such that the first cavity part is on one side of the beamsplitter and the second cavity part is on the other side of the beamsplitter, whereby the first cavity part provides a lower power level at the fundamental frequency $\omega$ and the second cavity part, being a resonant reflector at the fundamental frequency with respect to the first cavity part, provides a higher power level at the fundamental frequency $\omega$ to provide for an increase of the power of the second harmonic beam formed in the first nonlinear crystal by the second harmonic generation process and of the power of the higher harmonic beam formed in the second nonlinear crystal by the higher harmonic generation process, the higher harmonic beam being transmitted through the beamsplitter as the laser output.

12. The laser device as claimed in claim 11 wherein the laser cavity back mirror, the first end mirror and the second end mirror are highly reflective at the fundamental frequency $\omega$ and at the second harmonic frequency $2\omega$.

13. The laser device as claimed in claim 12, wherein the first nonlinear crystal is phase matched for second harmonic generation, the second non linear crystal is phase matched for frequency tripling, and the third or higher harmonic frequency is the third harmonic frequency $3\omega$.

14. The laser device as claimed in claim 12, wherein the first nonlinear crystal is phase matched for second harmonic generation, the second non linear crystal is phase matched for frequency quadrupling, and the third or higher harmonic frequency is the fourth harmonic frequency $4\omega$.

15. The laser device as claimed in claim 11 wherein the second end mirror is highly reflective at the third or higher harmonic frequency so as to output the higher harmonic beam in a desired direction through the beamsplitter which is highly transmissive at the third or higher harmonic frequency.

16. The laser device as claimed in claim 11 wherein backward reflectivity of the resonant reflector, with respect to radiation incident upon it from the first cavity part, is self-regulated by the presence of the first nonlinear crystal and the second nonlinear crystal in the second cavity part to be a substantially optimal value for out-coupling the fundamental frequency power circulating within the first cavity part.

17. The laser device as claimed in claim 11 wherein the second cavity part forming the resonant reflector provides the second step of power enhancement for intracavity frequency conversion, and at the same time performs as an optimal output coupler, maximizing extraction of power at the fundamental frequency from the first cavity part into the second cavity part.

18. The laser device as claimed in claim 11 wherein the complex cavity is preferably configured so as to maximize laser output, and hence to maximize the laser efficiency with respect to the pump power supplied to the gain medium.

19. The laser device as claimed in claim 11 wherein mirror curvatures of the laser cavity back mirror, the first end mirror and the second end mirror are chosen and configured to match the transverse and longitudinal mode structure of the laser beam within the complex cavity.

20. The laser device as claimed in claim 11 wherein the first cavity part further comprises at least one of the following: polarization selectors, wavelength selectors and cavity loss modulators for Q-switching.

* * * * *